United States Patent [19]

Brodt et al.

[11] 4,213,959
[45] Jul. 22, 1980

[54] MANUFACTURE OF ACICULAR, FERRIMAGNETIC IRON OXIDE

[75] Inventors: Rudolf Brodt, Weinheim; Helmut Jakusch; Eberhard Koester, both of Frankenthal; Werner Loeser, Ludwigshafen; Manfred Ohlinger, Frankenthal; Wilhelm Sarnecki, Limburgerhof; Werner Steck, Mutterstadt, all of Fed. Rep. of Germany

[73] Assignee: BASF Aktiengesellschaft, Fed. Rep. of Germany

[21] Appl. No.: 930,513

[22] Filed: Aug. 3, 1978

[30] Foreign Application Priority Data

Aug. 5, 1977 [DE] Fed. Rep. of Germany ....... 2735316

[51] Int. Cl.² ............................................. C01G 49/06
[52] U.S. Cl. ................................. 423/634; 252/62.56
[58] Field of Search ...................... 423/634; 252/62.56

[56] References Cited

U.S. PATENT DOCUMENTS

| | | | |
|---|---|---|---|
| 2,900,236 | 8/1959 | Speed et al. | 423/634 |
| 3,117,933 | 1/1964 | Abeck et al. | 252/62.56 |

FOREIGN PATENT DOCUMENTS

| | | | |
|---|---|---|---|
| 1138750 | 10/1962 | Fed. Rep. of Germany | 423/634 |
| 49-14400 | 2/1974 | Japan | 423/634 |
| 49-43899 | 4/1974 | Japan | 423/634 |

*Primary Examiner*—Jack Cooper
*Attorney, Agent, or Firm*—Keil & Witherspoon

[57] ABSTRACT

A process for the manufacture of acicular ferrimagnetic iron oxide by dehydrating acicular iron(III) oxide hydroxides to give acicular iron(III) oxides, then reducing these iron(III) oxides at from 300° to 650° C. by means of an organic compound which decomposes in this temperature range, and oxidizing the reduced product with an oxygen-containing gas at from 200° to 500° C., wherein the acicular iron(III) oxide hydroxides employed consist of a mixture of goethite and lepidocrocite, containing at least 60% of the latter, and the dehydration is carried out at from 250° to 700° C.

2 Claims, No Drawings

MANUFACTURE OF ACICULAR, FERRIMAGNETIC IRON OXIDE

The present invention relates to a process for the manufacture of acicular ferrimagnetic iron oxide by dehydrating acicular iron(III) oxide hydroxide to give acicular iron(III) oxide, then reducing this iron(III) oxide at from 300° to 650° C. by means of an organic compound which decomposes in this temperature range, and oxidizing the resulting product with an oxygen-containing gas at from 200° C. to 500° C.

Acicular ferrimagnetic iron oxides, eg. magnetite and gamma-iron(III) oxide, have long been used extensively as magnetizable material for the manufacture of magnetic recording media. A plurality of processes for the manufacture of gamma-iron(III) oxide, the material principally employed, has been disclosed. For example, British Pat. No. 675,260 describes a process for obtaining gamma-iron(III) oxide, in which acicular alpha-iron oxide hydroxide (goethite) is dehydrated to give alpha-iron(III) oxide, the product is converted to magnetite in a reducing atmosphere at above 300° C. and the magnetite is oxidized in air at below 450° C. to give acicular gamma-iron(III) oxide. In the course of attempts to improve the crystalline, mechanical and magnetic properties of such materials, this process has undergone a plurality of variations, both as regards the individual steps and as regards the starting materials employed.

Virtually simultaneously with the investigations leading to the process of the above British Patent, suitable magnetic iron oxides were obtained by the method disclosed in German Pat. No. 801,352, namely by treating non-magnetic iron oxide with a salt of a short-chain carboxylic acid and then heating the oxide to give magnetite, which again can be converted to gamma-iron (III) oxide by oxidation at from 200° to 400° C.

Subsequently, U.S. Pat. No. 2,900,236 disclosed that any organic compound which can be decomposed below 540° C., with little formation of tar or ash, may be used for reducing the non-magnetic iron oxide to give magnetite. To carry out this reduction, the iron oxide is brought into contact with the gaseous, solid or liquid organic substance and heated at from 540° to 650° C. Whilst U.S. Pat. No. 2,900,236 states that all organic substances conforming to the above requirement may be used and specifically mentions wax, starch and oil, German Published Application DAS 1,203,656 refers to salts of soluble soaps precipitated on the iron oxide, German Laid-Open Application DOS 2,064,804 mentions higher hydrocarbons, higher alcohols and amines, higher fatty acids and their salts, and oils, fats and waxes, East German Pat. No. 91,017 also mentions long-chain carboxylic acids and their salts, German Published Application DAS 1,771,327 mentions aliphatic monocarboxylic acids of 8 to 24 carbon atoms, which may or may not be mixed with morpholine, and Japanese Laid-Open Application 80,499/1975 mentions inert gases containing organic compounds, eg. ethanol, as reducing agents for obtaining magnetite from non-magnetic iron oxides. In the above processes of the prior art, the heating is in some cases carried out in the absence of air, so that the reaction stops at the magnetite stage, whilst in some cases it is carried out in the presence of air, whereby the magnetite is immediately oxidized to gamma-iron(III) oxide.

The iron oxide starting materials successfully employed for this conversion by means of an organic substance were in the main the corresponding alpha-modifications, eg. alpha-FeOOH and alpha-$Fe_2O_3$. However, delta-FeOOH (German Published Application DAS 1,203,656) and gamma-FeOOH (German Laid-Open Application DOS 2,212,435) have also been employed successfully.

The diverse efforts, described above, to improve the magnetic iron oxides suitable for the manufacture of magnetic recording media clearly show the endeavors to conform, by these means, to the increasingly high technical standards demanded of information recording media and to eliminate the disadvantages of other, alternative, magnetic materials.

It is an object of the present invention to improve the conventional acicular ferrimagnetic iron oxides and free them from their existing disadvantages. In particular, it is an object of the invention to provide acicular gamma-iron(III) oxide distinguished by high values of the coercive force and of the residual induction, by good crystallinity and by mechanical and magnetic stability.

We have found that this object is achieved and that acicular ferrimagnetic iron oxides possessing the above properties may be obtained by dehydrating acicular iron(III) oxide hydroxide to give acicular iron(III) oxide, then reducing the latter at from 300° to 650° C. by means of an organic compound which decomposes in this temperature range, and oxidizing the reduced product with an oxygen-containing gas at from 200° to 500° C., if the acicular hydrated iron(III) oxide employed consists of a mixture of goethite and lepidocrocite comprising at least 60% of lepidocrocite and is dehydrated at from 200° to 700° C.

It is particularly advantageous if, in the process of the invention, the acicular iron(III) oxide hydroxide in the mixture has a length/width ratio of at least 10 and is dehydrated at from 300° to 650° C.

The iron(III) oxide hydroxide composed of goethite and lepidocrocite comprises from 60 to 98%, preferably from 70 to 98%, of lepidocrocite. The mixture employed in the process according to the invention may be obtained by treating an iron(II) salt solution with an alkali under suitable reaction conditions, with simultaneous oxidation. It has proved particularly advantageous to from hydrated iron(III) oxide nuclei, in an amount of from 25 to 60 mole percent of the iron employed, from an aqueous iron(II) chloride solution by adding an alkali, eg. an alkali metal hydroxide or ammonia, at from 10° to 32° C., and stirring vigorously to produce fine air bubbles; the end product is subsequently formed from the nuclei by further growth at from 25° to 70° C., at a pH of from 4.0 to 5.8 obtained by adding further alkali, with vigorous dispersion of air in the mixture. After completion of the growth process, the solids content of iron(III) oxide hydroxide in the aqueous suspension should be from 10 to 50 g/l, preferably from 15 to 45 g/l. After filtering off and washing the precipitate, the iron(III) oxide hydroxide mixture obtained is dried at from 60° to 200° C.

Using the method described above by way of an example, stable acicular crystals of the goethite-lepidocrocite mixture, containing at least 60% of lepidocrocite, and exhibiting virtually no dendritic branching, may be obtained.

Further characteristics of the acicular goethite-lepidocrocite mixture suitable for use in the process of the invention are that the mean particle size is from 0.2 to 1.5 µm, preferably from 0.3 to 1.2 µm, and the length/width ratio is at least 10, values of from 12 to 40 having proved advantageous; the surface area of the particulate material, measured by the BET method using nitrogen and expressed as $S_{N_2}$, is from 18 to 70 m$^2$/g.

If a goethite-lepidocrocite mixture possessing the characteristics described above is dehydrated, in accordance with the invention, at from 200° to 700° C., preferably from 300° to 650° C. and especially from 450° to 600° C., before conventional further processing to ferrimagnetic iron oxide, it is found, surprisingly, that improved values of the coercive force and residual induction of the end products may be achieved. The dehydration may be carried out either in air or in an inert gas atmosphere.

The product obtained after dehydration is then converted to acicular ferrimagnetic iron oxide in the conventional manner by heating with an organic substance, which decomposes substantially without forming ash or tar, at from 300° to 650° C.

To carry out this step, the dehydrated goethite-lepidocrocite mixture is mixed mechanically with the solid or liquid organic substance or is coated with the substance in a suitable solution or suspension thereof, and is then heated in an inert gas at from 300° to 650° C. The process may also be carried out similarly by metering a gaseous organic substance into the inert gas. Suitable organic substances for the process according to the invention are any of the compounds described as suitable in the prior art, provided they can be decomposed at from 300° to 650° C. Advantageous substances to use are higher fatty acids, their derivatives, glycerol, mixtures of an inert gas and alcohol vapor, and methane. Depending on the organic substance used, and on the reaction temperature accordingly selected, the conversion of the dehydrated goethite-lepidocrocite mixture to acicular magnetite is complete after from about 1 to 120 minutes.

The acicular magnetite obtained by this reduction is usually oxidized to give gamma-iron(III) oxide, advantageously by passing air to oxygen over the material at from 200° to 500° C.

If, however, the conversion described above is not carried out in an inert gas, but in the presence of oxygen, eg. air, gamma-iron(III) oxide may be obtained directly if the treatment is carried out below about 500° C.

The acicular ferrimagnetic iron oxides, especially gamma-iron(III) oxide, manufactured according to the invention exhibit unexpectedly advantageous properties when used as magnetic pigments for the manufacture of magnetic recording media. To produce magnetic coatings, the gamma-iron(III) oxide is dispersed in a polymeric binder. Suitable binders are conventional compounds, eg. homopolymers and copolymers of vinyl monomers, polyurethanes, polyesters and the like. The binder is used as a solution in a suitable organic solvent, which may or may not contain other additives. The magnetic coatings are applied to rigid or flexible bases, eg. disks, films and cards.

The acicular ferrimagnetic iron oxides manufactured according to the invention, in particular the gamma-iron(III) oxide obtainable by this method, differ distinctly from the conventional gamma-iron(III) oxides in respect of their more uniform acicular shape (since agglomeration by sintering is avoided), their improved crystallinity and their higher coercive force and residual induction, resulting, surprisingly, from the process of the invention. These improvements in the magnetic material have a very noticeable effect on the magnetic tapes manufactured from the material.

The Examples which follow illustrate the invention.

The magnetic values are determined by measurements on an oxide sample, brought to a tap density $D = 1.2$ g/cm$^3$, using a conventional vibrating sample magnetometer at 100 kA/m measurement field strength. The coercive force ($H_c$) is recorded in [kA/m], whilst the specific remanence ($M_r/\rho$) and the specific induction ($M_m/\rho$) are recorded in [nT cm$^3$/g].

EXAMPLE 1

7.31 moles of FeCl$_2$ (926.6 g) are dissolved in demineralized water in a 26 liter reaction vessel, to give 9 liters of solution, and the latter is brought to 26° C. whilst passing nitrogen through it at a rate of 500 liters/h. 7.38 moles of NaOH (295.2 g) dissolved in 4.5 liters of demineralized water are then added in the course of from 30 to 40 minutes, whilst stirring at 500 rpm. After completion of the addition of NaOH, the mixture is stirred for a further 10 minutes and thereafter air, at the rate of 150 liters/h, is passed through the mixture, in place of nitrogen, until the pH has fallen to about 3.4. In this way, an orange suspension of nuclei is obtained in 2 hours 30 minutes.

This suspension is then heated to 40° C. with continued stirring at 500 rpm and passage of air at the rate of 150 liters/h. When 40° C. has been reached, the air flow rate is increased to 400 liters/h and the pH is kept at 4, by adding aqueous sodium hydroxide solution, until the reaction has ended. The growth of the nuclei requires 2 hours 40 minutes.

The suspension is filtered on a suction filter and the filter residue is washed with water until the filtrate is chloride-free, and is then dried in an oven at 130° C.

The resulting iron oxide hydroxide is a mixture of 94% of lepidocrocite and 6% of goethite and has a length/width ratio of 31 and a specific surface area, measured by the BET method, of 34.7 m$^2$/g.

This goethite-lepidocrocite mixture is dehydrated by heating in air at 490° C. for one hour. The resulting product is then mixed with 2% by weight of stearic acid; the mixture is divided into three identical samples 1A, 1B and 1C and is converted to magnetite under nitrogen, oxidized to gamma-iron(III) oxide in air, under the conditions recorded in Table 1. The magnetic properties are also shown in Table 1.

COMPARATIVE EXPERIMENT 1

The procedure described in Example 1 is followed, except that the goethite-lepidocrocite mixture is not dehydrated before conversion and oxidation. The reaction conditions, and the measured values, are shown in Table 1.

TABLE 1

|  | Conversion | | Oxidation | | Measured values | | |
| --- | --- | --- | --- | --- | --- | --- | --- |
|  | T[°C.] | Duration [min] | T[°C.] | Duration [min] | $H_c$ | $M_m/\rho$ | $M_r/\rho$ |
| Example 1 | | | | | | | |
| Sample A | 480 | 20 | 175 | 90 | 25.6 | 76 | 36 |
| Sample B | 470 | 20 | 290 | 90 | 25.9 | 76 | 41 |

TABLE 1-continued

| | T[°C.] | Conversion Duration [min] | T[°C.] | Oxidation Duration [min] | Measured values $H_c$ | $M_m/\rho$ | $M_r/\rho$ |
|---|---|---|---|---|---|---|---|
| Sample C | 488 | 20 | 297 | 90 | 25.5 | 79 | 42 |
| Comparative Experiment 1 | | | | | | | |
| Sample A | 490 | 20 | 275 | 90 | 20.7 | 75 | 37 |
| Sample B | 510 | 20 | 285 | 60 | 20.9 | 78 | 38 |

EXAMPLE 2

Using the procedure described in Example 1, iron-(III) oxide hydroxide mixtures containing 72% of lepidocrocite and having a specific surface area of 33.2 m²/g measured by the BET method, are prepared. These mixtures are dehydrated in air, in each case for one hour, at the temperatures shown in Table 2, then reduced to magnetite at 300° C. by passing a mixture of nitrogen and methanol vapor over the material, and thereafter oxidized in air at 400° C. to give gamma-iron-(III) oxide. The nitrogen-methanol mixture is formed by passing nitrogen at the rate of 50 liters/h through a vessel, heated at 105° C., into which methanol is metered. The resulting magnetic values are also included in Table 2.

TABLE 2

| Example | Dehydration temperature °C. | Reduction temperature °C. | Oxidation temperature °C. | $H_c$ | $M_m/\rho$ | $M_r/\rho$ | Surface area (BET method) M²/g |
|---|---|---|---|---|---|---|---|
| Experiment 1 | without dehydration | 300 | 400 | 22.1 | 77 | 42 | 24.5 |
| Experiment 2 | 300 | 300 | 400 | 23.2 | 76 | 42 | 20.6 |
| Experiment 3 | 400 | 300 | 400 | 24.1 | 74 | 41 | 22.1 |
| Experiment 4 | 500 | 300 | 400 | 26.1 | 80 | 45 | 19.2 |
| Experiment 5 | 600 | 300 | 400 | 27.0 | 78 | 46 | 18.7 |

EXAMPLE 3

4 goethite-lepidocrocite mixtures were prepared by the method described in Example 1. Sample D was prepared in a 26 liter reaction vessel and Samples E–G in a 700 liter stirred kettle (Table 3).

TABLE 3

| Example | Nucleation T [°C.] | Nucleation Time [min] | Growth at 40° C. Time [min] | pH | $S_{N_2}$ [m²/g] | X-ray analysis % gamma-FeOOH | % alpha-FeOOH |
|---|---|---|---|---|---|---|---|
| Sample D | 30 | 90 | 80 | 5.0 | 33.8 | 92 | 8 |
| Sample E | 25 | 215 | 255 | 5.0–5.5 | 23.6 | 82 | 18 |
| Sample F | 30 | 90 | 90 | 5.0 | 25.5 | 94 | 6 |
| Sample G | 18 | 180 | 255 | 4–5 | 30.8 | 96 | 4 |

The conversion conditions and the magnetic values are shown in Tables 4 and 5 below.

Table 5 lists samples which were dehydrated in 30 minutes at the relatively low dehydration temperature of 400° C. and were then converted to gamma-Fe₂O₃.

TABLE 5

| Starting material FeOOH | Reducing agent | Reduction T [°C.] | Reduction Time [min] | Oxidation T [°C.] | Oxidation Time [min] | $H_c$ |
|---|---|---|---|---|---|---|
| F | 3% of stearamide | 600 | 30 | 280 | 30 | 25.7 |
| G | 3% of glycerol trioleate | 520 | 25 | 230 | 60 | 23.0 |
| E | 3% of glycerol | 520 | 25 | 230 | 60 | 23.4 |

EXAMPLE 4

49.5 liters of a 30.1% strength FeCl₂ solution and 180 liters of tapwater were introduced into a 700 liter kettle. The pH of this mixture was 3.6, and the temperature was 16° C.

120 liters of an aqueous solution of NaOH, prepared from 97.2 liters of tapwater and 22.8 liters of a 25% strength sodium hydroxide solution, were introduced in the course of 30 minutes, whilst stirring. This corre-

TABLE 4

| Starting material | Dehydration conditions | Reducing agent | Reduction T [°C.] | Reduction Time [min] | Oxidation T [°C.] | Oxidation Time [min] | Magnetic values $H_c$ | $M_m/\rho$ | $M_r/\rho$ |
|---|---|---|---|---|---|---|---|---|---|
| Sample D | 30 min; 500° C. | Mixture of 1.2% of stearic acid, 1.2% of stearamide and 0.6% of lecithin | 600 | 30 | 230 | 90 | 27.8 | 75 | 42 |
| | not dehydrated | | 600 | 30 | 230 | 90 | 22.2 | 73 | 31 |
| Sample E | 30 min; 520° C. | Mixture of 1% of stearic acid and 2% of tallow alcohol | 520–550 | 30 | 280 | 90 | 24.4 | 78 | 41 |
| | not dehydrated | | 520–550 | 30 | 280 | 90 | 21.4 | 75 | 39 | sponds to 56% precipitation, based on Fe(II). After adding the alkali, the pH was found to be 7.2 and the temperature was 17° C.

After all NaOH had been introduced, the mixture was stirred for 5 minutes and then oxidized by introducing 5 m³ of air/h. At the same time, the temperature was raised to 24° C. over 40 minutes. After 4 hours 5 minutes, nucleation was complete and the pH had fallen to 3.4.

The suspension of nuclei was then heated to 33° C. in 1 hour 20 minutes, whilst continuing to pass air through the mixture at the rate of 5 m³/h. Thereafter the amount of air was increased to 8 m³/h and the pH brought to 5.5 by adding aqueous sodium hydroxide solution, and kept at this value to the end of the reaction. Starting from when the amount of air was increased to 8 m³/h, the mixture was heated to 38°-39° C. in 30 minutes, and kept at this temperature to the end of the growth reaction.

The oxidation was complete after 1 hour 40 minutes. The product was filtered on a filterpress, washed chloride-free with water and then dried in an oven at 110° C.

The resulting hydrated iron(III) oxide is a mixture of 92% of lepidocrocite and 8% of goethite and has a length/width ratio of 16 and a specific surface area, measured by the BET method, of 23.3 m²/g.

200 g of this goethite-lepidocrocite mixture are dehydrated by heating in air at 500° C. for 30 minutes. The resulting product is mixed with 2% of stearic acid and then kept at 110°-120° C. in a drying oven for 30 minutes. The subsequent reduction to $Fe_3O_4$ is effected in 30 minutes at 550° C.; the oxidation to gamma-$Fe_2O_3$ is effected by means of air, in 90 minutes, after the $Fe_3O_4$ has cooled to 280° C. The resulting sample is coded H.

A comparative sample J was prepared from the same starting material, under identical conditions except for the omission of the dehydration step (Table 6).

TABLE 6

|  | $H_c$ | $M_m/\rho$ | $M_r/\rho$ |
|---|---|---|---|
| Sample H | 26.8 | 82 | 43 |
| Comparative sample J | 21.7 | 79 | 36 |

Magnetic pigment dispersions are prepared from both the gamma-iron(III) oxide samples, namely H and J, and the dispersions are subsequently used to produce magnetic tapes.

To prepare the two magnetic dispersions, ball mills are filled with 8,000 parts of steel balls of 5 mm diameter, and thereafter 700 parts of the particular magnetic material, 420 parts of a mixture of equal parts of tetrahydrofuran and dioxane, 8.75 parts of lecithin, 8.75 parts of a neutral polyaminoamide salt and 210 parts of a 20% strength solution of a copolymer of 80% of vinyl chloride, 10% of dimethylmaleate and 10% of diethyl maleate (K value = 58) in a mixture of equal parts of tetrahydrofuran and dioxane are added. The mixture is predispersed for 40 hours. 1,090 parts of a 10% strength solution of a thermoplastic polyester-urethane (obtained from adipic acid, 1,4-butanediol and 4,4'-diisocyanatodiphenylmethane) in a mixture of equal parts of tetrahydrofuran and dioxane, and 0.7 part of polydimethylsiloxane, are then added. After dispersing for a further 5 hours, the resulting magnetic dispersion is filtered under pressure through a filter of 5 μm pore size. A 6 μm thick polyethylene terephthalate film is then coated with the magnetic dispersion by the conventional method, using a knife coater, and after passing through a magnetic field the coating is dried at from 60° to 100° C. The thickness of the magnetic coating on the film, after drying, is 5 μm. The coating is calendered by passing it between heated rollers at 80° C., under a nip pressure of about 3 kg/cm. The coated film is cut into tapes 6.25 mm wide.

The electroacoustic measurements are carried out as described in DIN 45,512, Part II.

Table 7 shows the results obtained.

TABLE 7

|  |  | Sample H | Sample J |
|---|---|---|---|
| Magnetic tape values |  |  |  |
| $H_c$ | [kA/m] | 25.8 | 21.0 |
| $M_m$ | [mT] | 170 | 167 |
| $M_r$ | [mT] | 147 | 125 |
| $M_r/M_m$ |  | 0.86 | 0.75 |
| $E_{333}$ |  | 0 | +0.3 |
| $E_{10}$ kc/s |  | −0.4 | −1.8 |
| $A_T$ |  | −0.5 | −2.0 |
| $A_H$ |  | 0 | −2.8 |
| $RG_0$-A-curve |  | −1.3 | −1.5 |
| Kd |  | +2 | −0.3 |

We claim:

1. A process for the manufacture of acicular ferrimagnetic gamma-ferric oxide, comprising:
   (a) Dehydrating at a temperature from about 300° to 650° C. a mixture of needle-shaped particles of 60 to 98% by weight of lepidocrocite and 2 to 40% by weight of goethite, said particles having a mean particle size of from 0.2 to 1.5 microns and a length:width ratio of at least 10;
   (b) Reducing the particles thus obtained at a temperature of from 300° to 650° C. to magnetite particles by means of an organic compound which decomposes in this temperature range without producing ash or tar; and
   (c) Oxidizing the resulting magnetite particles with an oxygen-containing gas at a temperature of from 200° to 500° C. to convert said resulting magnetite particles into acicular ferrimagnetic gamma-ferric oxide particles.

2. The process of claim 1, wherein the needle-shaped particles of said mixture of lepidocrocite and goethite have a length:width ratio of from 12 to 40.

* * * * *